US006962420B2

(12) United States Patent
Branham (10) Patent No.: US 6,962,420 B2
(45) Date of Patent: Nov. 8, 2005

(54) VEHICLE MIRROR ASSEMBLY (75) Inventor: Michael Dean Branham, Blythewood, SC (US)

(73) Assignee: Lang Mekra North America, LLC, Ridgeway, SC (US)

( * ) Notice: Subject to any disclaimer, the term of this patent is extended or adjusted under 35 U.S.C. 154(b) by 52 days.

(21) Appl. No.: 10/663,447

(22) Filed: Sep. 16, 2003

(65) Prior Publication Data

US 2005/0057829 A1    Mar. 17, 2005

(51) Int. Cl.[7] .............................. G02B 5/08; G02B 7/18
(52) U.S. Cl. ........................ 359/841; 359/881; 248/481
(58) Field of Search ................................ 359/871, 872, 359/875, 881, 841; 248/475.1–484

(56) References Cited

U.S. PATENT DOCUMENTS

| 1,356,599 A | 10/1920 | Carlisle |
| 1,430,379 A | 9/1922 | Hubbell |
| 1,595,557 A | 8/1926 | Mamiya |
| 2,458,117 A | 1/1949 | Tolbert |
| 2,511,971 A | 6/1950 | Dalton |
| 2,569,144 A | 9/1951 | Benson |
| 2,884,218 A | 4/1959 | Gilchrist |
| 3,107,077 A | 10/1963 | Lassa |
| 3,119,591 A | 1/1964 | Malecki |
| 3,170,985 A | 2/1965 | Katulich |
| 3,339,876 A | 9/1967 | Kampa |
| 3,371,903 A | 3/1968 | Thompson |
| 3,372,897 A | 3/1968 | Lee |
| 3,384,334 A | 5/1968 | Malachowski |
| 3,784,149 A | 1/1974 | Brudy |
| 3,889,915 A | 6/1975 | Hashiguchi et al. |
| 4,012,022 A | 3/1977 | Tomita |
| 4,512,634 A | 4/1985 | Stout |
| 4,592,529 A | 6/1986 | Suzuki |
| 4,623,115 A | 11/1986 | Brester |
| 4,692,000 A | 9/1987 | Wada et al. |
| 4,747,679 A | 5/1988 | Beach, Jr. |
| 4,778,265 A | 10/1988 | Fingerle et al. |
| 4,789,232 A | 12/1988 | Urbanek |
| 4,830,326 A | 5/1989 | Schmidt et al. |
| 4,877,319 A | 10/1989 | Mittlehasuer |
| 4,881,766 A | 11/1989 | Schmidt et al. |
| 4,883,349 A | 11/1989 | Mittlehauser |
| 4,929,074 A | 5/1990 | Urban |
| 4,991,814 A | 2/1991 | Schmidt et al. |
| 5,005,797 A | 4/1991 | Maekawa et al. |
| 5,022,748 A | 6/1991 | Espirito Santo |
| 5,060,905 A | 10/1991 | Sharp |

(Continued)

FOREIGN PATENT DOCUMENTS

EP    0379733    8/1990

(Continued)

OTHER PUBLICATIONS

English Language Abstract for FR 2519918 from espacenet.com.

(Continued)

Primary Examiner—Mark A. Robinson
Assistant Examiner—Alessandro Amari
(74) Attorney, Agent, or Firm—McNair Law Firm, P.A.; Cort Flint (57) ABSTRACT A vehicle mirror assembly for mounting a mirror to a vehicle body includes a connection head, a positive lock assembly, and a holder. The holder and the connection head are attached to one or the other of a tie bar and a mirror support arm and rotatably secured together. Methods of assembling and using the vehicle mirror assembly are also provided.

24 Claims, 5 Drawing Sheets

U.S. PATENT DOCUMENTS

| | | | |
|---|---|---|---|
| 5,069,410 | A | 12/1991 | McKee |
| 5,098,058 | A | 3/1992 | Polzer |
| 5,106,049 | A | 4/1992 | Schmidt |
| 5,107,374 | A | 4/1992 | Lupo et al. |
| 5,120,015 | A | 6/1992 | do Espirito Santo |
| 5,137,247 | A | 8/1992 | Lang et al. |
| 5,150,258 | A | 9/1992 | Schmidt et al. |
| 5,210,652 | A | 5/1993 | Perkinson |
| 5,301,916 | A | 4/1994 | Schmidt et al. |
| 5,363,245 | A | 11/1994 | Borello |
| 5,432,640 | A | 7/1995 | Gilbert et al. |
| D366,235 | S | 1/1996 | Schmidt et al. |
| 5,483,385 | A | 1/1996 | Boddy |
| 5,639,054 | A | 6/1997 | Gerndt et al. |
| D385,243 | S | 10/1997 | Lang |
| 5,880,895 | A | 3/1999 | Lang et al. |
| 6,286,968 | B1 | 9/2001 | Sailer et al. |
| 6,302,549 | B1 | 10/2001 | Branham et al. |
| D452,671 | S | 1/2002 | Lang |
| 6,336,726 | B1 | 1/2002 | Lang et al. |
| 6,361,178 | B1 | 3/2002 | Lang et al. |
| 6,369,702 | B1 | 4/2002 | Lang |
| 6,371,620 | B1 | 4/2002 | Lang et al. |
| D460,393 | S | 7/2002 | Kidd |

FOREIGN PATENT DOCUMENTS

| | | |
|---|---|---|
| FR | 2 093 271 A | 1/1972 |
| FR | 2519918 | 8/1983 |
| GB | 1 339 124 | 11/1973 |
| GB | 2048803 | 12/1980 |
| JP | 62251255 | 11/1987 |

OTHER PUBLICATIONS

English Language Abstract for JP 62251255 from espacenet.com.

VEHICLE MIRROR ASSEMBLY

FIELD OF INVENTION

The present invention relates in general to a vehicle mirror assembly for mounting a mirror to a vehicle body. More specifically, the invention includes a positive lock assembly for rotatably securing a connection head and a holder together.

BACKGROUND OF INVENTION

Conventional external mirror arrangements for vehicles include a holder extending from and fastened to the side of the vehicle body. The holder is often a U-shaped bracket equipped with a lower and an upper, horizontally running support arm. The bracket and its free ends are pivotally linked to the vehicle body. One or more external mirrors are installed on the U-shaped bracket. The mirrors may be a flat main mirror and a convex, wide angle mirror. A drawback with these conventional mirror arrangements is that due to their relatively large dimensions and the correspondingly heavier mirror, especially for commercial vehicles, it is difficult to make the holder both highly stable and vibration-free.

One attempt to stabilize the conventional holder is to use a tie-bar support as shown for example in U.S. Pat. No. 5,880,895. This tie-bar support is coupled on one end to a mirror mounting arm at an external point spaced apart from a swivelable attachment point on the vehicle. The tie-bar support is swingably attached to the vehicle body on another end behind the point where the mirror mounting arm is installed. Thus, with the mirror mounting arm coupled to the tie-bar, a rigid triangular reinforcement structure is formed to stabilize the holder.

In certain situations, the mirror holder must be folded in to the vehicle body to drive the vehicle through a very narrow passage, for instance, or when the vehicle is undergoing a lengthy maintenance period. Thus, folding the mirror back in such situations protects the mirror from damage. Additionally, it is desirable for the mirror holder to be deflected inwardly if contact is possible with oncoming vehicles.

In order to both stabilize and fold back the mirror, the coupling between the tie-bar and the corresponding support arm must be releasable. When the coupling is released, the added support for the holder is removed and the holder can swing inward toward the vehicle body.

Certain known releasable couplings between the tie-bar and the support arm are often heavy and troublesome to recouple. Other releasable couplings such as the arrangement provided in U.S. Pat. No. 5,880,895 are made of plastic and rubber components, which frictionally engage each other and are thus vulnerable to weather and wear.

BRIEF SUMMARY OF INVENTION

The present invention provides a vehicle mirror assembly for mounting a mirror to a vehicle body and methods of attaching the vehicle mirror assembly to the vehicle body. The component parts of the invention are simple, reliable, and economical to manufacture, assemble, and use. Other advantages of the invention will be apparent from the following description and the attached drawings or can be learned through practice of the invention.

According to one aspect of the invention, an assembly for releasably securing a mirror support arm and tie-bar together is provided. The assembly includes a connection head mountable to the mirror support arm for supporting a mirror. The connection head has a rotation element, and a positive lock assembly is disposed proximate the rotation element. The positive lock assembly includes a spring having a spring constant for urging a locking element of the positive lock assembly to a resting position. A predetermined amount of external force will overcome the spring constant causing the spring and locking element to yield and uncouple the positive lock assembly from a holder.

In this aspect of the invention, the holder is attached to the tie-bar and configured to slide onto the rotation element. The holder defines a swivel face having a depression in which the locking element of the positive lock assembly is positionable. As noted, the spring constant of the positive lock assembly urges the positive lock assembly to the resting position in the depression such that the holder is releasably secured to the connection head.

In a further aspect of the invention, a vehicle mirror assembly for mounting a mirror to a vehicle body is disclosed. The assembly has a connection head defining a swivel disk mountable to one of two ends of a tie bar, the other end of the tie bar being pivotally mounted to a vehicle. A positive lock assembly is disposed proximate the swivel disk. The positive lock assembly has a spring element with a spring constant to urge the positive lock assembly toward a resting position. Also in this aspect, a holder is mountable to a mirror support arm for supporting a mirror. The holder has a swivel face with a depression in which the positive lock assembly is positionable. The positive lock assembly is yieldable to an external force against the swivel face. The spring constant of the positive lock assembly urges the positive lock assembly to the resting position in the depression such that the holder is rotatably secured to the connection head.

According to another aspect of the invention, a method for attaching a vehicle mirror assembly to a vehicle body includes the steps of pivotally attaching a first end of a tie bar to a vehicle; mounting a connection head to a second end of the tie bar or to a mirror support arm for supporting a mirror, the connection head defining a swivel disk; mounting a holder to the other of the second end of the tie bar or the mirror support arm; inserting a positive lock assembly proximate the swivel disk, the positive lock assembly defining a spring constant for urging the positive lock assembly to a resting position and for yielding the positive lock assembly to an external force; and sliding the holder and the swivel disk together, the holder defining a swivel face having a depression therein, the positive lock assembly yieldable to the external force and positionable in the depression, the spring constant of the positive lock assembly urging the positive lock assembly to the resting position in the depression such that the holder and the connection head are rotatably secured together.

Additional features and advantages of the invention will become apparent to those skilled in the art upon consideration of the attached drawings in conjunction with the following description of the drawings, which exemplifies the best mode of carrying out the invention as presently perceived, or can be learned through practice of the invention.

BRIEF DESCRIPTION OF THE DRAWINGS

The above and other aspects and advantages of the present invention are apparent from the detailed description below and in combination with the drawings in which.

DETAILED DESCRIPTION OF THE DRAWINGS

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

As broadly embodied in the Figures, a vehicle mirror assembly is provided for releasably securing a mirror support arm and tie bar together. In general, the vehicle mirror assembly includes a connection head defining a swivel disk, a holder slidable onto the swivel disk, and a positive lock assembly disposed between the swivel disk and the holder to rotatably secure the holder and the connection head together. These elements and an exemplary method of assembly are described in greater detail below, but it is to be understood that the following descriptive examples of the invention are not intended to limit the present invention to use only as shown in the Figures.

As embodied in FIGS. 1–4, a vehicle mirror assembly, generally designated by the number 10, is provided for stabilizing and manipulating a mirror support arm 50. One or more mirrors M are mounted to the vehicle body V via the support arm 50, and a tie-bar 42 is attached to the vehicle body V and to the support arm 50 to hold the support arm 50 in place.

The vehicle mirror assembly 10 generally includes a holder 12, a connection head 26, and a positive lock assembly 30. The holder 12 is attached to the tie-bar 42 at one end 42a with another end 42b of the tie-bar 42 being pivotally mounted to the vehicle body V. The connection head 26 is mounted to the mirror support arm 50, and defines a rotation or connection element ("swivel disk") 28 onto which the holder 12 is slid to releasably secure the holder 12 and the connection head 26 together. The swivel disk 28 can be made to rotate relative to the connection head 26 if required, but is shown here as fixed and unitarily formed with the connection head 26. Stated alternatively, the holder 12 moves in a substantially linear direction relative to the disk 28 during attachment and detachment of the connection head 26 and disk 28. However, some rotational movement of the connection head 26 relative to the disk 28 is provided to permit some rotation or swivel action, for instance, to align the components during attachment. It will be appreciated that the holder 12 and the tie-bar 42 can be unitarily formed. It is to be understood, of course, that holder 12 and connection head 26 may be reversed in their placement on tie-bar 42 and support arm 50. Additionally, any or all of the component parts in this aspect of the invention can be formed of metal or suitably hardened thermoplastics.

Figure 2:
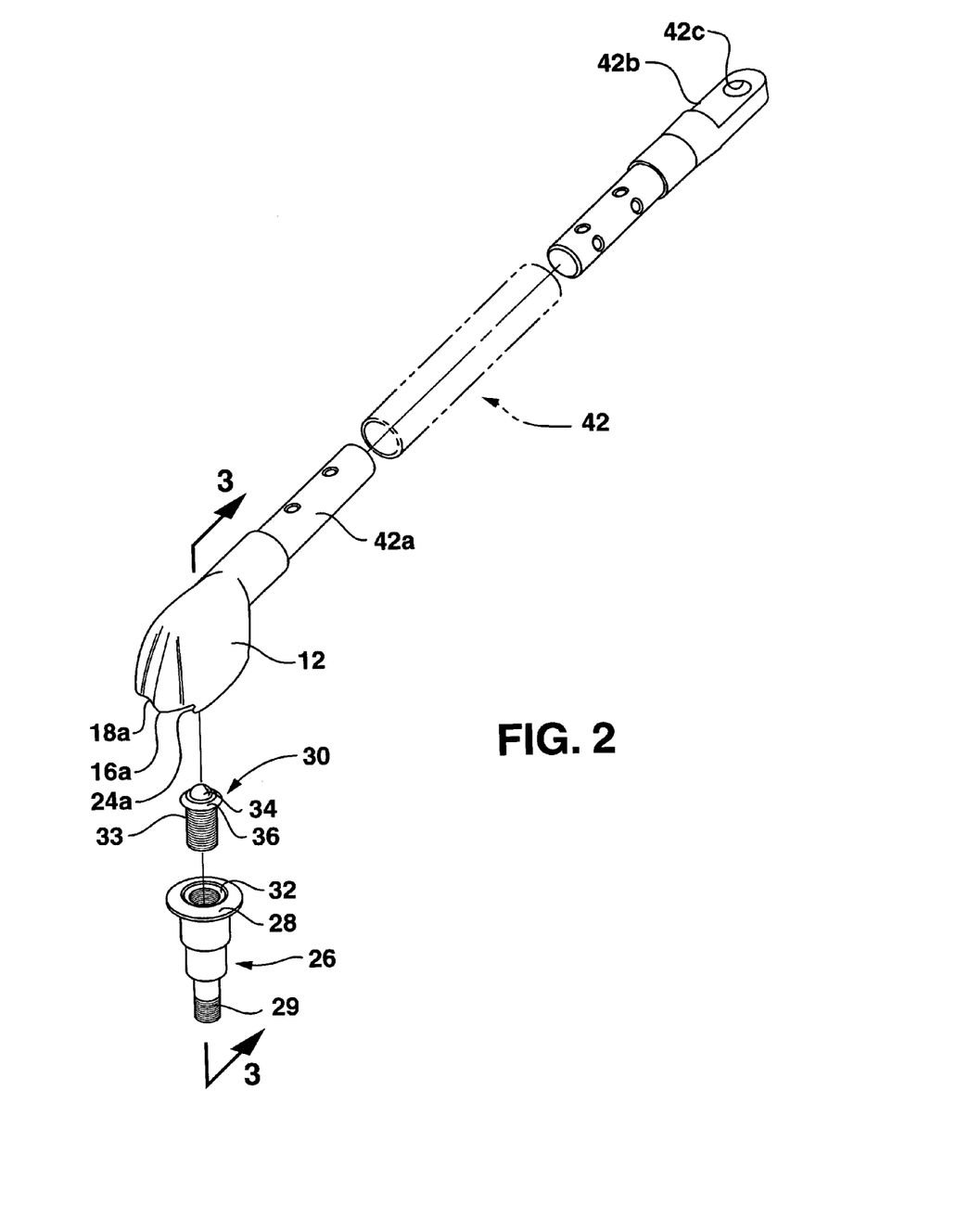
FIG. 2 is an exploded perspective view of a portion of the vehicle mirror assembly as in FIG. 1.
Figure 3:
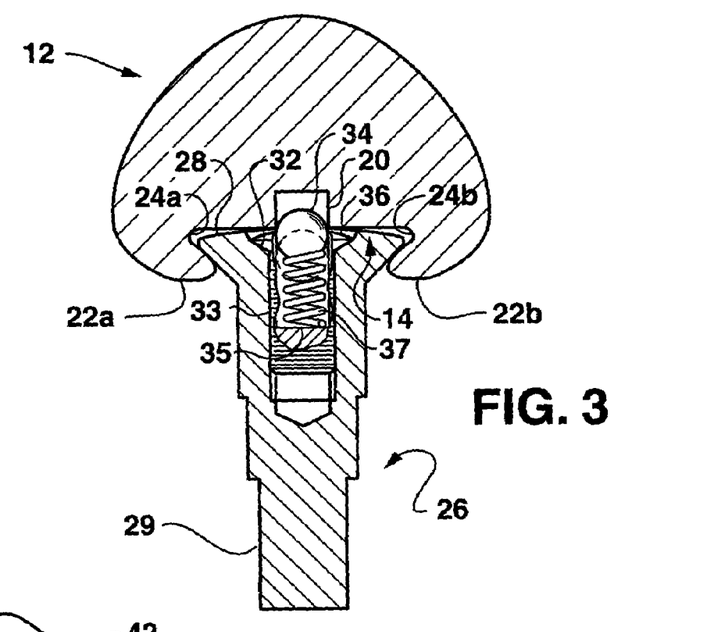
FIG. 3 is a partial cross-sectional view taken along line 3—3 in FIG. 2 particularly showing a positive lock assembly.
Figure 4:
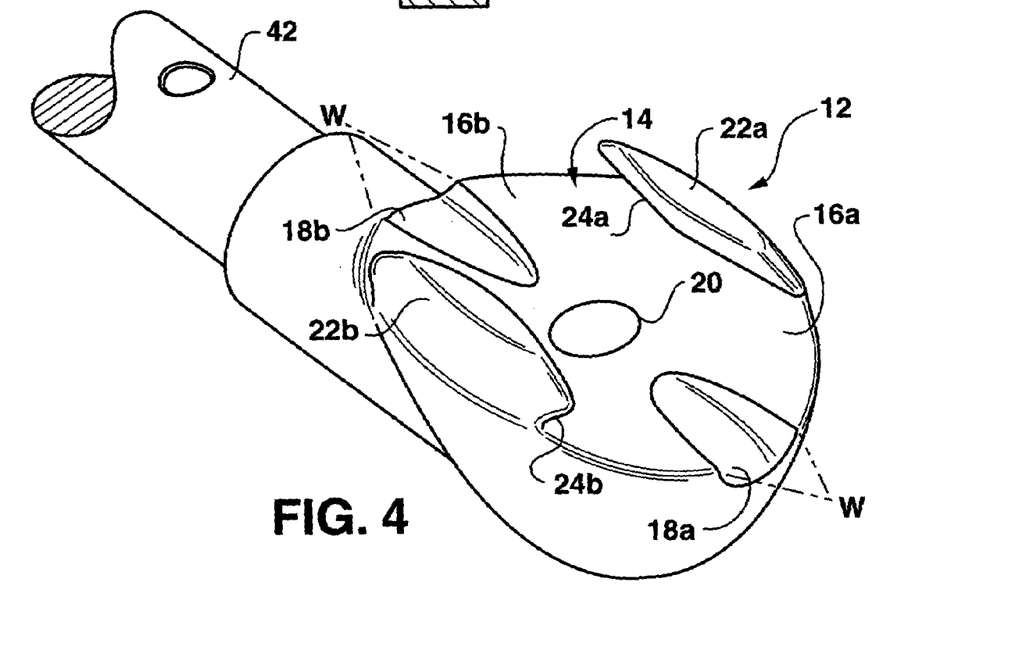
FIG. 4 is a partial bottom perspective view of a holder as in FIG. 2.

With reference to FIGS. 2–4, the holder 12 includes a swivel or attachment face 14 that defines an open end 16a, more particularly two open ends 16a, 16b, and a locking hole or depression 20 for reception of a portion of the positive lock assembly 30. The holder 12 further defines retaining projections 22a, 22b, which define respective recesses 24a, 24b. The retaining projections 22a, 22b depend inwardly from the swivel face 14 in the direction of the depression 20 in order to swivably secure the positive lock assembly 30, explained further below. A cross-section of the swivel face 14 and retaining projections 22a, 22b, taken substantially perpendicular to a longitudinal axis X of the tie-bar 42, is substantially C-shaped as shown in FIG. 3.

FIGS. 2 and 3 show the swivel disk 28, a mounting element 29 and a seat 32 of the connection head 26. The mounting element 29 is attached to the mirror support arm 50 by a suitable mechanism such as screw threads on which a nut (not shown) is attached to hold the connection head 26 to the mirror support arm 50. Further description is not necessary to one skilled in the art to understand how to mount the connection head 26 to the mirror support arm 50 and is not further described herein.

The positive lock assembly 30 includes a main body 33 defining a cavity 35 and a circumferential flange 36. A spring or biasing element 37 is disposed within the cavity 35 and urges a ball-shaped mechanism 34 in a direction outward from the cavity 35. FIG. 3 particularly shows the positive lock assembly 30 inserted in the seat 32 of the connection head 26. More specifically, the locking mechanism 34 is releasably engaged in the depression 20 in a resting or locking position. The connection head 26 and positive lock assembly 30 are mounted to the mirror support arm 50 (see FIG. 1). The locking mechanism 34 is ball-shaped in this example, and the depression 20 complementarily shaped to receive the locking mechanism 34. However, it will be appreciated that other shapes such as saw-tooth ratchet, oval, and the like can be substituted. Moreover, the locking mechanism 34 and the depression 20 may define a detent aspect to restrict movement of the vehicle mirror assembly 10 to a given area; i.e., to limit a range of motion of the vehicle mirror assembly 10.

As shown most clearly in FIG. 4, the holder 12 further includes channels 18a, 18b that have bowl-shaped cross-sections and that each define a width W. The respective widths W of channels 18a, 18b become narrower and shallower in a direction of the depression 20 to guide the positive lock assembly 30 toward the depression 20.

Figure 1:
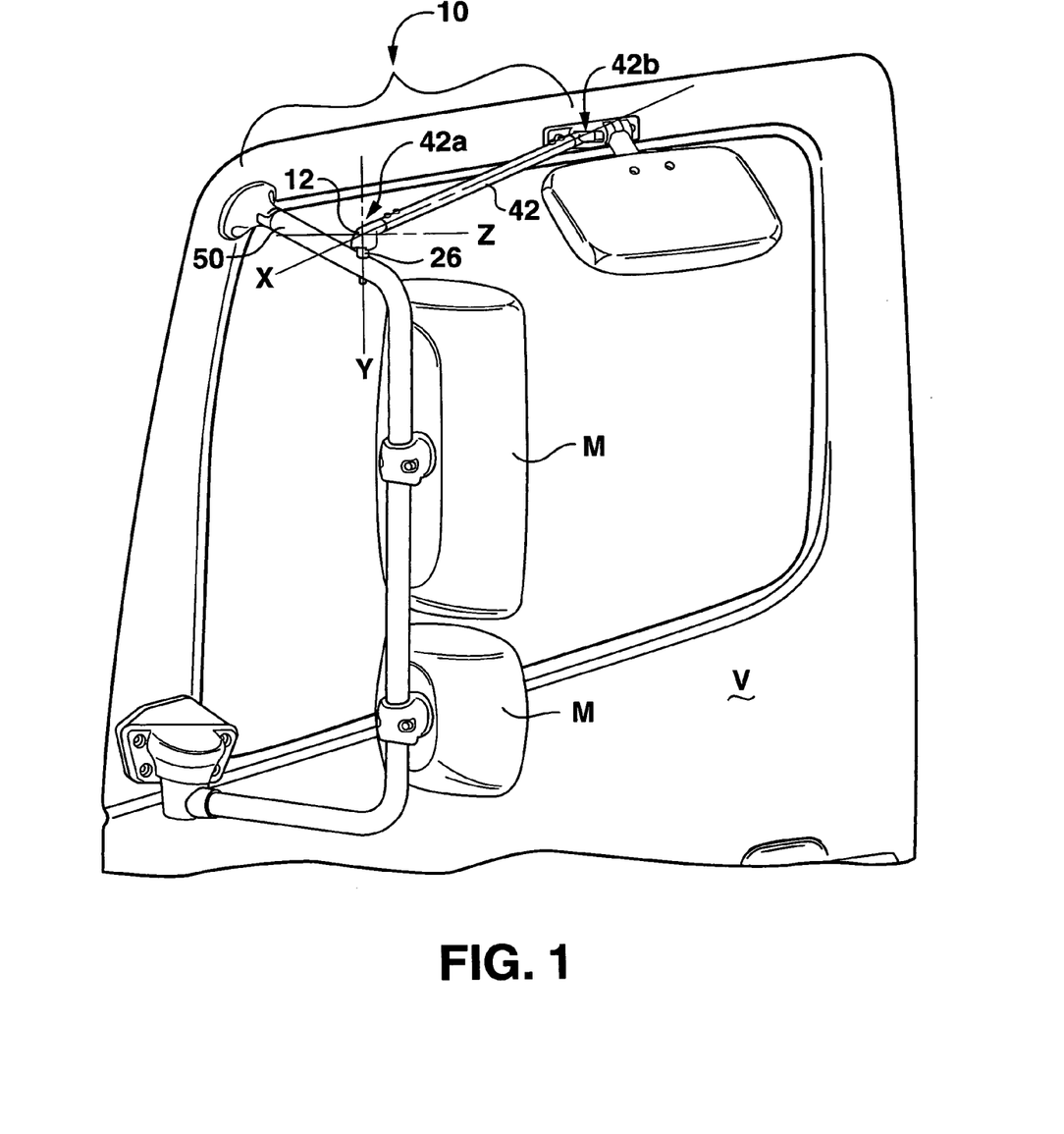
FIG. 1 is a perspective view of a vehicle mirror assembly in accordance with one embodiment of the present invention.

The present embodiment may be best understood with reference to an exemplary method of assembling the mirror assembly 10 as shown in FIGS. 1–4. Steps include inserting the positive lock assembly 30 in the connection head 26 and seating the positive lock assembly 30 in seat 32. The connection head 26 is attached to the mirror support arm 50, and the holder 12 is attached to the tie-bar 42 at one end of the tie-bar 42 with the other end of the tie-bar 42 being pivotally attached to the vehicle V as shown in FIG. 1. The tie-bar 42 is configured for displacement along the longitudinal axis X to slide the holder 12 onto (or apart from) the swivel disk 28 of the connection head 26.

As the holder 12 engages the swivel disk 28, the open end 16a, for example, receives the swivel disk 28 and the respective guide channel 18a receives and depresses the positive lock assembly 30, more particularly the ball-shaped mechanism 34, to at least momentarily overcome a spring constant of the spring element 37 within the positive lock assembly 30. The relatively wider width W of the channel 18a near the open end 16a eases initial engagement and depression of the ball-shaped mechanism 34 (see ball 34 in phantom transition in FIG. 3). The retaining projections 22a, 22b, in cooperation with respective recesses 24a, 24b, slide about the swivel disk 28. The retaining projections 22a, 22b are spaced apart from one another so as to swivably interlock the swivel disk 28 of the connection head 26 between the retaining projections 22a, 22b.

As the holder 12 and the tie-bar 42 slide longitudinally onto the swivel disk 28, and as the width W of the guide channel 18a narrows and becomes shallower in the direction of the depression 20, the spring constant of the spring element 37 within the positive lock assembly 30 is gradually overcome such that the holder 12 slides onto the swivel disk 28. Once the ball-shaped mechanism 34 approaches and aligns substantially along a perpendicular axis Y (FIG. 1), the spring element within the positive lock assembly 30 causes the ball-shaped mechanism 34 to release and return to the resting position (see FIG. 3) such that the ball-shaped mechanism 34 projects at least partially into the depression 20 of the holder 12. Accordingly, the ball-shaped mechanism 34 positively locks the connection head 26 and the holder 12 together.

A pre-determined amount of force applied along the longitudinal axis X will overcome the spring constant of the positive lock assembly 30 to permit longitudinal movement and subsequent detachment of the holder 12 from the swivel disk 28 of the connection head 26. As introduced above, some swiveling or rotational movement is also provided to permit these operations. Thus, the longitudinal and rotational movements permit detachment of the components, for instance, for parking, maintenance or replacement of the vehicle mirror assembly 10. Also, if the vehicle mirror assembly 10 is inadvertently driven into or hit by an obstacle, either from the front or the rear, the spring force within the positive lock assembly may be overcome, thereby allowing the mirror assembly to pivot toward the vehicle. This releasable coupling may advantageously avoid damage to the mirror assembly and/or the vehicle in such situations, as compared to a permanently a fixed coupling.

Figure 5:
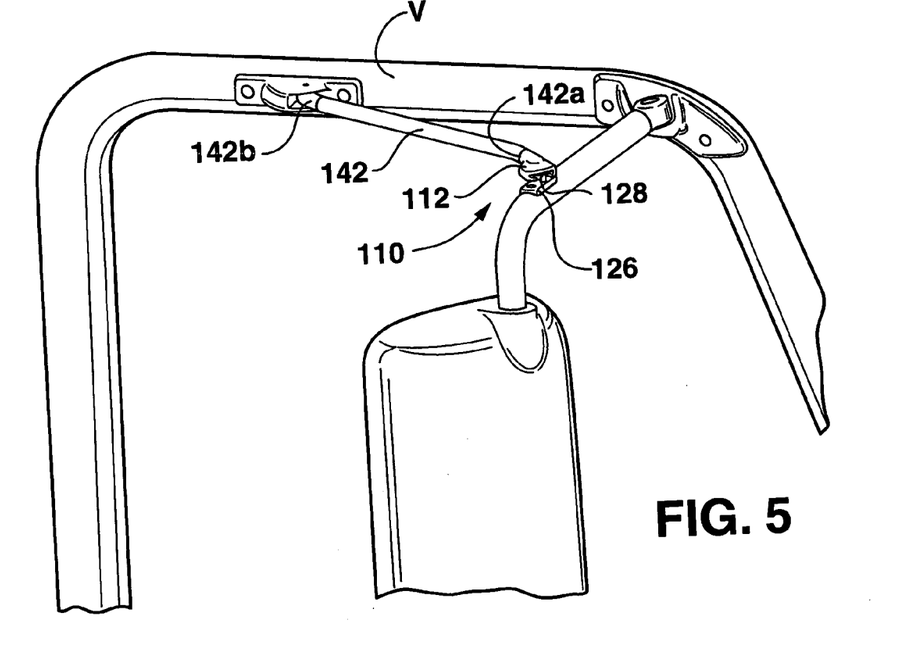
FIG. 5 is a perspective view of another embodiment of a vehicle mirror assembly in accordance with the present invention.
Figure 6:
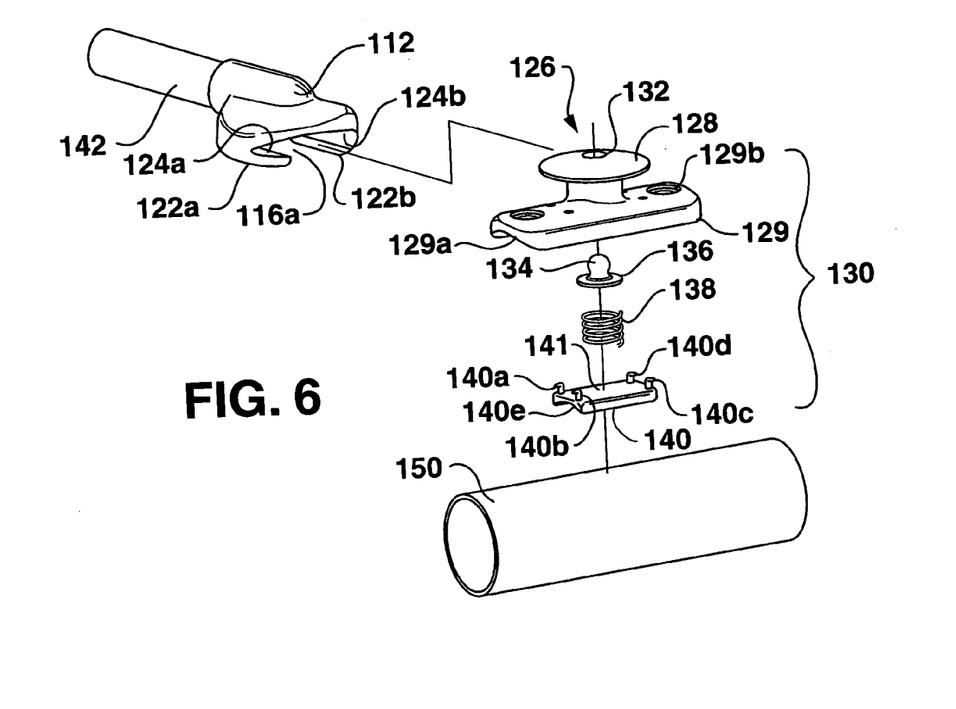
FIG. 6 is an exploded view of the assembly as in FIG. 4 showing a step in a method of assembling the vehicle mirror assembly in accordance with another aspect of the present invention.

In another embodiment of the invention shown generally in FIGS. 5 and 6, a vehicle mirror assembly 110 is attached to a vehicle V. In this aspect of the invention, the vehicle mirror assembly 110 generally includes a holder 112 attached to one end 142a of a tie-bar 142, the other end 142b of the tie-bar 142 being pivotally attached to the vehicle V. The vehicle mirror assembly 110 further generally includes a connection head 126 with a swivel disk 128, the connection head 126 being attached to a mirror support arm 150. This embodiment is similar in some ways to the foregoing embodiment; therefore, for brevity, only pertinent differences are discussed below and reference is made to the previous embodiment for descriptions of like elements and operation. For instance, the holder 112, similar to the holder 12 of the previous embodiment, includes retaining projections 122a, 122b and recesses 124a, 124b. Therefore, reference is made to the previous embodiment for descriptions of similar elements and their operation.

With particular reference to FIG. 6, a positive lock assembly 130 includes a 20 ball-shaped mechanism 134 with a flange 136 and a spring element 138 disposed between the ball-shaped mechanism 134 and a spring holder 140. The positive lock assembly 130 is operably held between the connection head 126 and the mirror support arm 150. The ball-shaped mechanism 134 is inserted into a seat 132 of the connection head 126, in similar operation to the ball-shaped mechanism 34 of the previous embodiment, and projects partially into a depression (not shown) of the holder 112.

This embodiment may be best understood with reference to an exemplary method of assembly. Initially, the spring element 138 is captured between the flange 136 of the ball-shaped mechanism 134 and a spring seat 141 of the spring holder 140. A plurality of retaining projections 140a–d are located about the spring holder 140 for attachment such as by snap-fit to an underside or receptacle area 129a of the connection head 126. The spring holder 140 defines a curvilinear surface or bar seat 140e, which is shaped to complement the mirror support arm 150. Similarly, the receptacle area 129a of the mounting element 129 is complementary to the mirror support arm 150. The mounting element 129 further includes screw holes 129b for attaching the connection head 126 to the mirror support arm 150. It is to be understood that the shapes of the receptacle area 129a, the bar seat 140e and the mirror support arm 150 can be varied widely within the scope of the invention. Further detail need not be provided to understand this aspect of the invention.

Upon connection of the connection head 126 to the mirror support arm 150 with the positive lock assembly 130 operably disposed in between, the ball-shaped mechanism 134 projects partially from the seat 132 as introduced above. Similar to the first embodiment, the holder 112 is slid onto the swivel disk 128 such that the positive lock assembly 130 yields to the external force and is positionable in the depression of the holder 112 until the positive lock assembly 130, and in particular the ball-shaped mechanism 134, positively locks the holder 112 and the connection head 126 together. It will be appreciated that the various components can be oriented differently but effect a positive-lock according to the invention. For example, the ball-shaped mechanism 134 and the spring element 138 can be alternatively disposed in the holder 112 for operative connection to the connection head 126.

Figure 7:
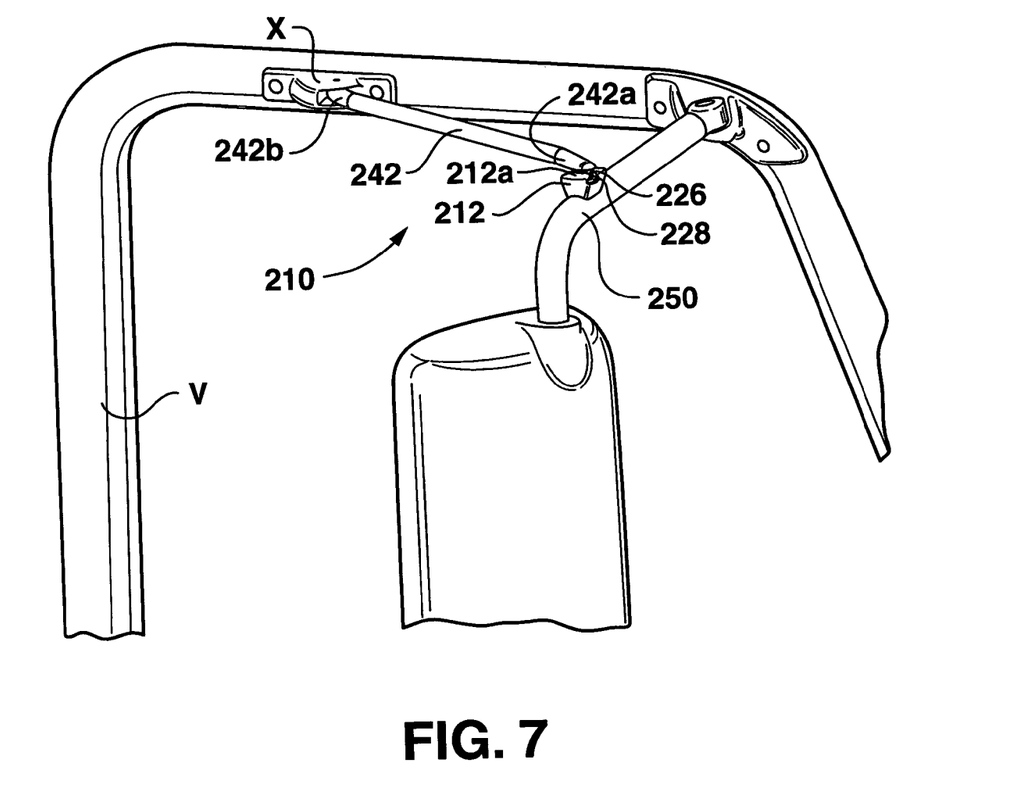
FIG. 7 is a perspective view of a further embodiment of a vehicle mirror assembly in accordance with the present invention.

In another embodiment of the invention shown in FIG. 7, a vehicle mirror assembly 210 is attached to a vehicle V. In this aspect of the invention, the vehicle mirror assembly 210 generally includes a tie-bar 242 with a connection head 226 attached to one end 242a of the tie-bar 242, the other end 242b of the tie-bar 242 being pivotally attached to the vehicle V. Also generally in this embodiment, a holder 212 is attached to a mirror support arm 250. This embodiment is in some ways similar to the foregoing embodiments; therefore, only pertinent differences are discussed below and reference is made to the previous embodiments for descriptions of like elements and operations. For instance, a swivel disk 228 is defined on the connection head 226 and operates similarly to the connection head 26 and swivel disk 28 of the first embodiment. However, the connection head 226 is attached on the end 242a of the tie-bar 242 instead of on the mirror support arm 250. Likewise, the holder 212 and a positive lock assembly (similar to element 30 of the foregoing embodiment) operate in a manner similar to the first embodiment, but in this aspect of the invention the holder 212 is attached to the mirror support arm 250 instead of the tie-bar 242. It will again be appreciated that the connection head 226 and the tie-bar 242 can be unitarily formed.

This embodiment may be better understood with reference to an exemplary method for attaching the vehicle mirror assembly 210 to the vehicle V as shown in FIG. 7. The method includes the steps of: pivotally attaching a first end 242b of a tie bar 242 to a vehicle V; mounting a connection head 226 to a second end 242a of the tie bar 242 or to a mirror support arm 250 for supporting a mirror M, the connection head 226 defining a swivel disk 228; mounting a holder 212 to the other of the second end 242a of the tie bar 242 or the mirror support arm 250; inserting a positive lock assembly proximate the swivel disk 228, the positive lock assembly defining a spring constant for urging the positive lock assembly to a resting position and for yielding the positive lock assembly to an external force; and sliding the holder 212 and the swivel disk 228 together, the holder 212 defining a swivel face having a depression therein, the positive lock assembly yieldable to the external force and positionable in the depression, the spring constant of the positive lock assembly urging the positive lock assembly to the resting position in the depression such that the holder 212 and the connection head 226 are rotatably secured together.

The method may also include the step of displacing the tie-bar 242 along a longitudinal axis X of the tie-bar 242 for one of sliding the holder 212 and the swivel disk 228 apart or for sliding the holder 212 and the swivel disk 228 together.

Another step in the method may include displacing the tie-bar 242 and the holder 212 away from the longitudinal axis X substantially simultaneous with the longitudinal displacement such that the holder 212 and the swivel disk 228 are slidable onto or apart from each other to respectively couple or uncouple the holder 212 and the swivel disk 228. Further, the method may include the step of depressing the positive lock assembly as the holder 212 and the connection head 226 are slid together, the holder 212 defining an open end 212a therein and a guide channel disposed in the open end 212a such that the open end 212a receives the swivel disk 228 and receives and depresses the positive lock assembly via the guide channel to positively lock the holder 212 with the connection head 226.

While exemplary embodiments of the invention have been shown and described, those skilled in the art will recognize that other changes and modifications may be made to the foregoing examples without departing from the scope and spirit of the invention for instance, specific shapes of various elements of the illustrated embodiments may be altered to suit particular applications. It is intended to claim all such changes and modifications as fall within the scope of the appended claims and their equivalents.

That which is claimed is:

1. An assembly for releasably securing a mirror support arm and a tie-bar together on a vehicle, the assembly comprising:
   a mirror support arm for supporting a mirror;
   a tie-bar for connection between said support arm and the vehicle;
   a connection head having a connection element carried by one of said support arm and tie-bar;
   a holder carried by the other of said support arm and tie-bar for attaching with said connection element;
   a positive lock assembly disposed proximate the connection element, the positive lock assembly having a locking element movable between a locking position in which the locking element protrudes from said positive lock assembly and a retracted position in which the locking element is at least partially withdrawn into said positive lock assembly, and said positive lock assembly having a biasing element urging said locking element into said locking position with respect to said holder and yielding to withdraw said locking element into said retracted position to allow the locking element to be moved in response to an external force so that said holder and connection element may be detached; and
   said holder slidably receiving said connection element, said holder having a swivel face with a depression, said locking element positionable in said depression in said locking position, and said biasing element urging the positive lock assembly to said locking position in said depression so that the holder is detachably secured to said connection head.

2. The assembly of claim 1, wherein the connection head includes a seat configured to receive the positive lock assembly, and a mounting element configured to mount the connection head to one of said support arm and tie-bar.

3. The assembly of claim 2, wherein the positive lock assembly defines a flange configured for seating with the seat of said mounting element.

4. The assembly of claim 1, wherein at least a portion of the positive lock assembly defines a ball-shaped cross-section.

5. The assembly of claim 1, wherein the tie bar and holder are configured for displacement along a longitudinal axis such that the holder and connection element are slidable together or apart to respectively couple or uncouple the holder and the connection element.

6. The assembly of claim 1, wherein said holder includes a plurality of retaining projections having recesses defined between the retaining projections and said swivel face for slidably receiving said connection element, said retaining projections extending inwardly toward said depression of said swivel face.

7. The assembly of claim 6, wherein the retaining projections are spaced apart from one another so as to swivably interlock the connection element of the connection head therebetween.

8. The assembly of claim 1, wherein the holder has a U-shaped cross-section.

9. The assembly of claim 1, including an open end defined in the holder and a guide channel defined in the open end, the open end configured to receive the connection element, the guide channel configured to receive and depress the positive lock assembly to swivably interlock the holder and the connection head.

10. The assembly of claim 9, wherein the guide channel has a bowl-shaped cross-section.

11. The assembly of claim 9, wherein a width of the guide channel narrows from the open end in a direction of the depression.

12. The assembly of claim 1, wherein said positive lock assembly includes a spring holder carried by said connection head said spring holder having a surface shaped complementary to one of said tie-bar and mirror support arm.

13. The assembly of claim 12, including a spring element disposed between said connection head and said spring holder, said spring holder defining a spring seat to seat said spring element.

14. The assembly of claim 13, wherein said spring holder defines a catch for attachment to said connection head to retain said spring element between said connection head and spring holder.

15. A vehicle mirror assembly mounting a mirror to a vehicle comprising:
   a mirror support arm for supporting a mirror;
   a tie-bar carried between said vehicle and said support arm;
   a connection head having a connection element carried by one of said tie-bar and support arm;
   a holder carried by the other of said tie-bar and support arm for connection to said connection element;
   a positive lock assembly carried by said connection element, said positive lock assembly having a biasing element vertically urging a locking element into a locking position with said holder; and
   said holder having a swivel face with a depression formed therein, said locking element yieldable by application of an external force to movement and disengagement from said depression; said biasing element urging said locking element into said locking position in said depression so that said holder is rotatably secured to said connection head.

16. The vehicle mirror assembly of claim 15, wherein said connection head further defines a seat configured to receive said positive lock assembly.

17. The vehicle mirror assembly of claim 16, wherein said locking element and includes a spring element configured to urge the locking mechanism towards said locking position.

18. The vehicle mirror assembly of claim 15, wherein said tie bar is configured for displacement along a longitudinal axis such that said holder and the connection element are slidable relative to each other to couple or uncouple the holder and the connection element.

19. The vehicle mirror assembly of claim 15, wherein the holder includes two retaining projections having recesses for slidably receiving said connection element slidable between said recesses, said retaining projections extending inwardly toward said depression.

20. The vehicle mirror assembly of claim 15, further including an open end defined in the holder and a guide channel disposed in the open end, the open end configured to receive the connection element, the guide channel configured to receive and depress the positive lock assembly to swivably interlock the holder and the connection head.

21. A method for attaching a vehicle mirror assembly to a vehicle said assembly including a tie-bar for connection to the vehicle, a support arm for connection to said tie-bar, and a mirror carried by said support arm, the method comprising the steps of:
   pivotally attaching a first end of a tie bar to a vehicle;
   mounting a connection head to one of a second end of said tie bar and said mirror support arm for supporting a mirror wherein said connection head includes a connection element;
   mounting a holder to the other end of said mirror support arm;
   providing a locking element movable between a locking position and a retracted position, and a biasing element having a spring constant urging said locking element into said locking position between said connection element and said holder and said spring constant yielding to allow said locking element to move to said retracted position during engagement of said connection element and said holder; and
   sliding the holder and the connection element together, so that said locking element engages in said locking position with a depression formed in a swivel face of said holder so that said holder and said connection head are rotatably secured together.

22. The method of claim 21, comprising the step of displacing said tie bar along a longitudinal axis of the tie bar for one of sliding the holder and the connection element apart or for sliding the holder and the connection element together.

23. The method of claim 21, includes providing a holder having a plurality of retaining projections having recesses and sliding said recesses over the connection element.

24. The method of claim 21, further including the step of depressing the positive lock assembly providing a holder having an open end and a guide channel disposed in the open end, the open end configured to receive the connection element, the guide channel configured to receive and depress the positive lock assembly, and sliding the holder and connection head together.

* * * * *